Nov. 4, 1930.　　　　　A. McLENNAN　　　　　1,780,307
PORTABLE GRAIN LOADING DEVICE
Filed Jan. 15, 1929　　2 Sheets-Sheet 1

Inventor
Arpad McLennan
By
Attorney

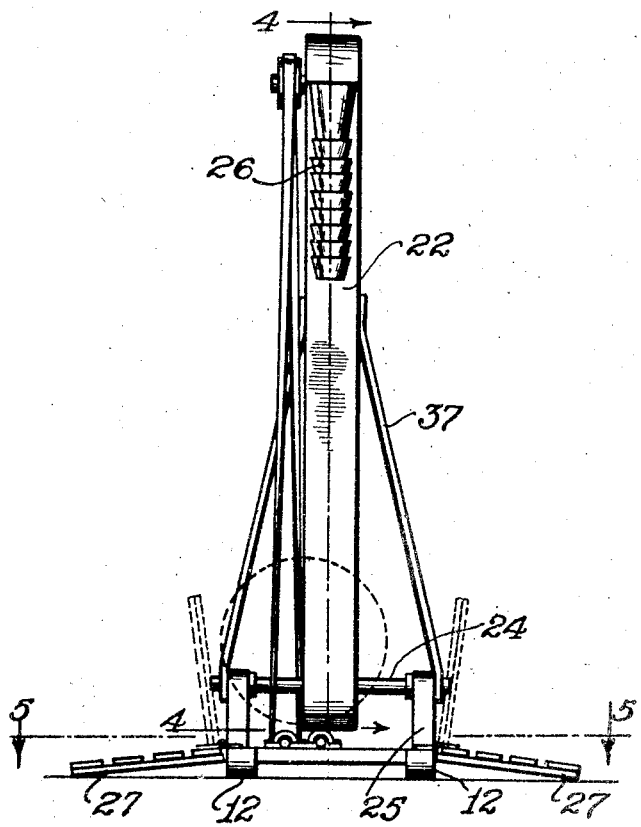
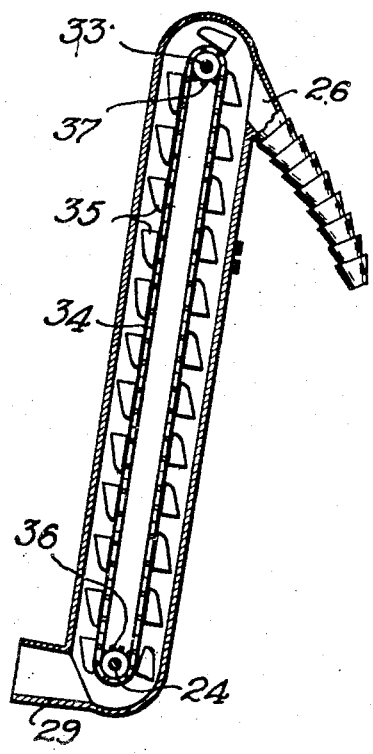
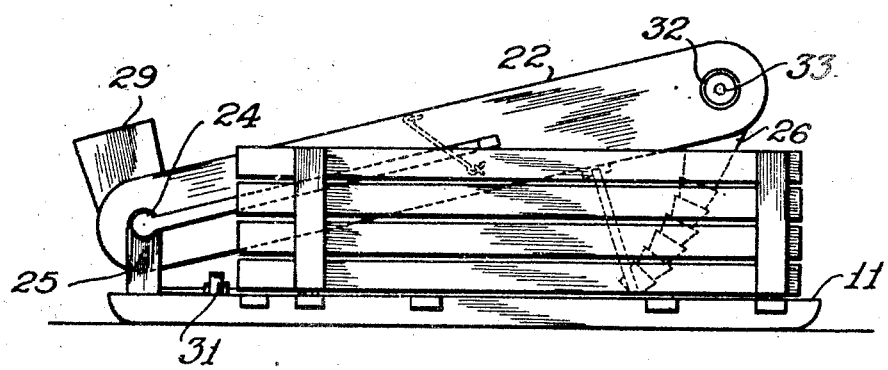

Patented Nov. 4, 1930

1,780,307

UNITED STATES PATENT OFFICE

ARPAD McLENNAN, OF KITSCOTY, ALBERTA, CANADA

PORTABLE GRAIN-LOADING DEVICE

Application filed January 15, 1929, Serial No. 332,603, and in Canada June 8, 1928.

This present invention relates to new and useful improvements in a portable grain loading device and has for its primary object the provision of a simple structure including a sleigh platform serving as the support for the grain elevator and also carrying power transmission mechanism whereby the grain elevator may be operated by the rear wheels of the motor truck, to be loaded from the bin.

Another object of the invention resides in the provision of a portable grain loading device which is constructed in such a manner that the grain elevator may be supported in upright position on the platform when in use or may be folded onto the platform and the side extensions of the latter turned up against the grain elevator during transportation of the device.

A further object of the invention resides in the provision of a portable grain loading device of the character stated in which the platform may be readily drawn with the grain elevator thereon, by connecting the end of the platform with the motor truck and the grain elevator raised on the end of the truck and attached to the grain bin for loading grain from the bin into the truck after the side extensions of the truck have been turned down and the motor vehicle run onto the platform from one side thereof with the rear wheels of the motor truck resting on the rollers on the power transmitting shafts operatively mounted longitudinally of the center of the platform for transferring driving power to the grain elevator.

A still further object of the invention resides in the provision of a portable grain loading device of the character stated which is of simple and inexpensive construction and operation composed of the minimum number of parts and highly efficient in operation.

To the accomplishment of these and related objects as will become apparent as the description proceeds, my invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure, wherein like characters indicate like parts throughout the several views.

In the drawings:—

Figure 3 is a side elevation of the device with the motor truck removed from the platform;

Figure 4 is a vertical section through the grain elevator taken substantially on the plane of line 4—4 of Figure 3, looking in the direction indicated by the arrows; and Figure 5 is a rear elevation of the platform with the grain elevator in its folded position thereon and the extensions of the platform turned up.

Figure 1:
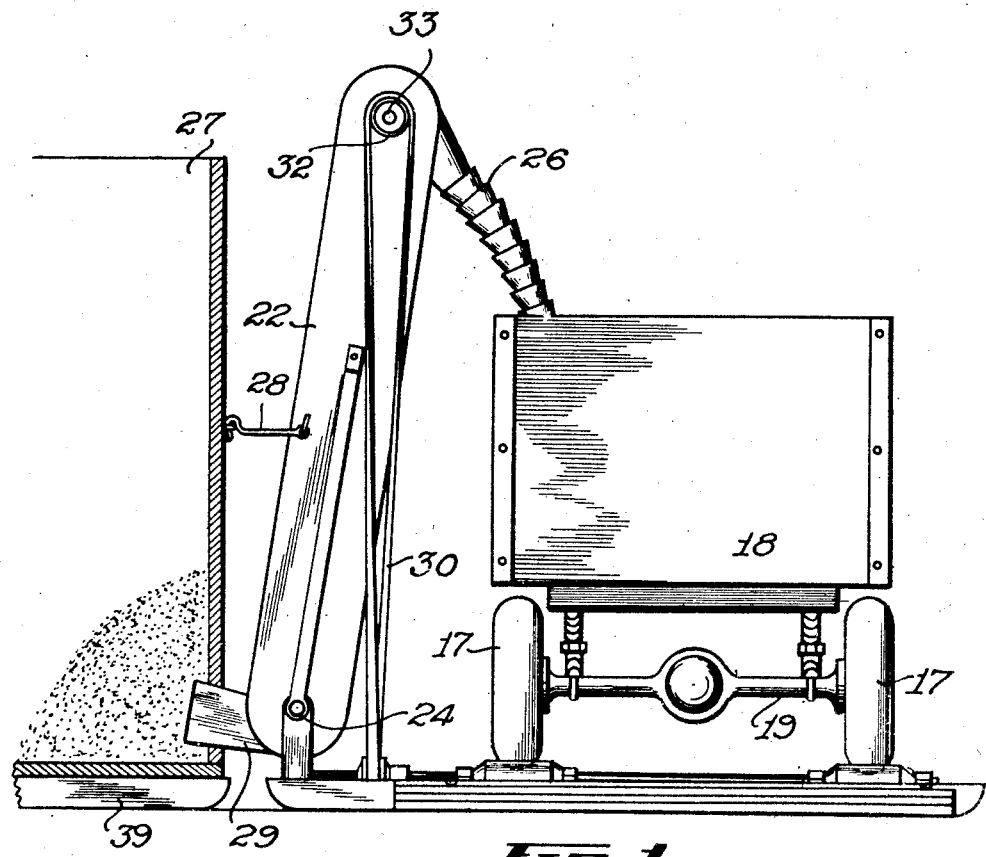
Figure 1 is a rear elevation of the portable grain loading device in operation.
Figure 2:
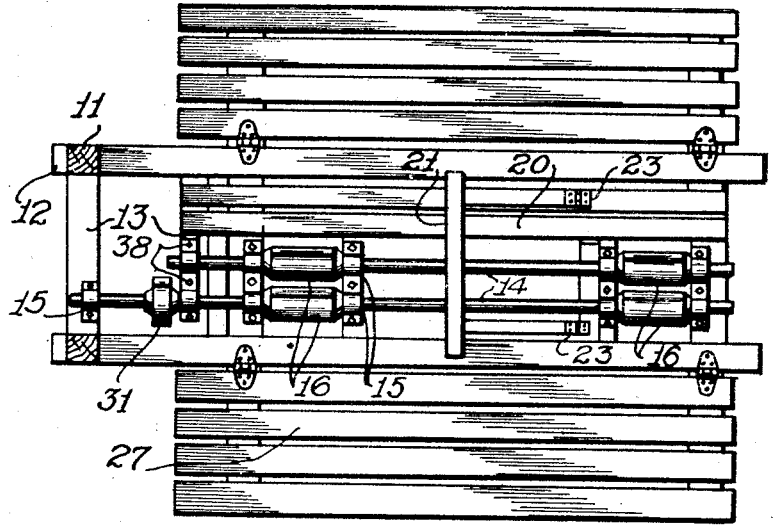
Figure 2 is a plan of the platform.

Referring more in detail to the drawings, it is to be noted that the device includes a truck platform 11 composed of longitudinal sleigh runners 12 and transverse bracing members 13 extended thereacross. A pair of longitudinal shafts 14 are mounted longitudinally on the truck platform 11 by suitable shaft bearings 15 carried on the transverse bracing members 13. The shafts 14 are arranged at one side of the platform 11 in spaced relation and carry near their opposite ends the pairs of elongated rollers 16 on which may rest the rear wheels 17 of the motor truck 18 when the latter is run onto the truck platform from one side, so as to cause rotation of the shafts 14 by transmission of power thereto from the motor truck rear axle 19. The other half of the platform 11 has spaced longitudinal strips 20 secured on the transverse bracing members 13 to prevent the motor truck rear wheels 17 from dropping through the platform 11 when the truck is being moved onto or off of the platform 11. Hinged on the platform 11 near one end of the main portion thereof, is the elevator support 21 on which the grain elevator 22 rests when folded to inoperative position, the legs of the support 21 being attached to the platform 11 at their lower ends by appropriate hinges 23. The grain elevator 22 is mounted by its lower shaft 24 on the upstanding bearings 25 carried on the other end of the platform 11 and when in its folded position extends on a slight incline over the platform 11 and longitudinally thereof, the sectional flexible discharge spout 26 of the elevator being directed toward the platform 11 and thus protected against liability of injury during transportation of the device. Hinged to either longitudinal edge or side of the platform 11 is a side extension 27 extending nearly the entire length thereof and adapted to incline downwardly to the surface on which the truck platform 11 rests to permit the motor truck to be moved onto or off of the platform 11 from either side thereof, when the grain elevator 22 is in its normal upright position and the elevator support 21 is folded downwardly to its inoperative position. When the grain elevator 22 is folded down to inoperative position on the platform 11, to permit transportation of the device, the side extensions 27 for the platform 11 should be turned up toward either side of the grain elevator 22 and in which position they may be retained by any suitable means or in any preferred manner, during transportation of the device.

When in its upstanding or operative position, the grain elevator 22 may be held adjacent the grain bin 27 by one or more clamping hooks 28 and the intake spout 29 for the grain elevator 22 inserted in the lower portion of the grain bin 27 to feed grain from the latter into the bottom of the grain elevator 22. A power transmitting belt 30 operates over the belt wheel 31 on an extended end of one of the shafts 14 and the belt 30 also operates on the belt wheel 32 carried on the upper elevator shaft 33, thus driving the endless bucket chains 34 of the grain elevator 22 within the casing of the elevator and carrying the spaced elevator buckets 35 which gather the grain from the bottom of the elevator and transfer the grain to the upper end of the elevator, from which it is discharged through the flexible sectional discharge spout 26 of the elevator and into the truck 18. It is to be understood that the bucket chains 34 operate around sprocket wheels 36 on the upper and lower elevator shafts 33 and 24 respectively. Appropriate braces 37 are attached to the outer extremities of the shaft 24 and converge upwardly with their upper end secured to the sides of the casing of the grain elevator 22. The belt 30 may be removed from the belt wheel 32 for folding downwardly the grain elevator 22 and transporting the device. In addition to the bearing brackets 15 for the shafts 14, a pair of special supporting brackets 38 are provided on the platform 11 and adapted to be tightened on the shafts 14 to prevent rotation of said shafts 14 and the rollers 16 when the motor truck 18 is being moved onto or off of the platform 11. It is also to be understood that the grain bin 27 may be supported on runners 39 to permit moving or transportation of the bin 27 over snow or ice surfaces.

As the construction of the device has thus been described, in detail, brief reference is now had to its use and modus operandi: For transportation purposes the grain elevator 22 is supported in its folded position or inoperative position on the platform 11 and the platform 11 drawn over the surface by the motor truck 18, in travelling to or away from the grain bin 27. When it is desired to transfer grain from the grain bin 27 to the motor truck 18, the platform 11 is moved to position with one end thereof toward the side of the bin 27 and the intake spout 29 of the grain elevator 22 inserted in the opening provided therefor in the lower portion of the side grain bin 27. The grain elevator 22, naturally must be in its upstanding operative position at this time and may be held rigid by the hooks 28 attached to the body of the grain elevator 22 and engaged with appropriate members on the grain bin 27. By moving the motor vehicle 18 onto the platform 11, after lowering of the platform side extensions 27, until the rear wheels 17 of the motor truck 18 rest on the pairs of rollers 16, the motor truck 18 will thus be in position to receive the grain from the grain bin 27, by way of the grain elevator 22, the flexible sectional discharge spout 26 of which hangs over the top of the motor truck 18 to discharge therein. Operation of the rear axle 19 of the motor truck 18 will result in rotation of the rollers 16 by the motor truck rear wheels 17, thus permitting transfer of the power by the belt 30 to the upper shaft 33 of the grain elevator 22, thus resulting in the grain being gathered from the grain bin 27 by the grain elevator 22 and transferred into the motor truck 18.

From the foregoing description taken in connection with the accompanying drawings, it will be manifest that a portable grain loading device is provided that will fulfill all the necessary requirements of such a device, but as many changes could be made in the above description and many apparently widely different embodiments of my invention may be constructed within the scope of the appended claims without departing from the spirit or scope thereof, it is intended that all matters contained in the said accompanying specification and drawings, shall be interpreted as illustrative and not in a limited sense.

Having thus described my invention, what I claim as new and desire to secure by Letters Patent is:—

1. A portable grain loading device including a platform having longitudinal shafts thereon with pairs of rollers adjacent opposite ends; side extensions hinged to said platform; a grain elevator hinged to one end of said platform and supported in upright position thereon for operation; said grain elevator being adapted to be folded down over said platform for transportation purposes; said side extensions of the platform being adapted to be folded up against said grain elevator for transportation purposes; a support on said platform for said grain elevator when the latter is folded down in inoperative position on said platform; and means for transferring power from one of said shafts to said grain elevator to operate the latter when in operative upstanding position.

2. A portable grain loading device including a platform having sleigh runners thereunder; side extensions hinged to said platform and adapted to be folded up over the main portion thereof; a grain elevator hingedly mounted by its lower shaft on one end of said platform and adapted to operate thereon in upstanding position; means for operating said grain elevator from said platform; said means including a pair of shafts with elongated rollers thereon and adapted to be driven by the driving wheels of a motor vehicle resting on said rollers; means for preventing operation of said shafts and rollers during placing of the motor vehicle on the platform with the drive wheels thereof resting on said rollers and during removal of said motor vehicle from the platform; said grain elevator being adapted to be operatively connected with a grain bin for transferring grain therefrom to the motor vehicle on said platform; and means carried by said platform for receiving and supporting said grain elevator in inoperative position on said platform during transportation of the device.

3. A portable grain loading device including a platform having longitudinal shafts thereon with pairs of elongated rollers near their opposite ends; side extensions hinged to said platform and adapted to engage the surface when in operative position; said side extensions being adapted to be turned up to inoperative position for transportation of the device; upstanding bearings at one end of said platform; a grain elevator pivotally mounted between said upstanding bearings; operative connections between one of said shafts and said grain elevator; bracing means for said grain elevator; said grain elevator being adapted to be attached to a grain bin to receive grain therefrom; said rollers being adapted to be operated by the driving wheels of a motor truck run transversely onto said platform over one of the turned down side extensions thereof; said grain elevator being adapted to discharge into the motor truck on the platform; and means to prevent operation of said rollers while positioning the driving wheels of the motor truck on said rollers and while removing said motor truck driving wheels from said rollers.

In testimony whereof I hereunto affix my signature.

ARPAD McLENNAN. [L. S.]